United States Patent Office.

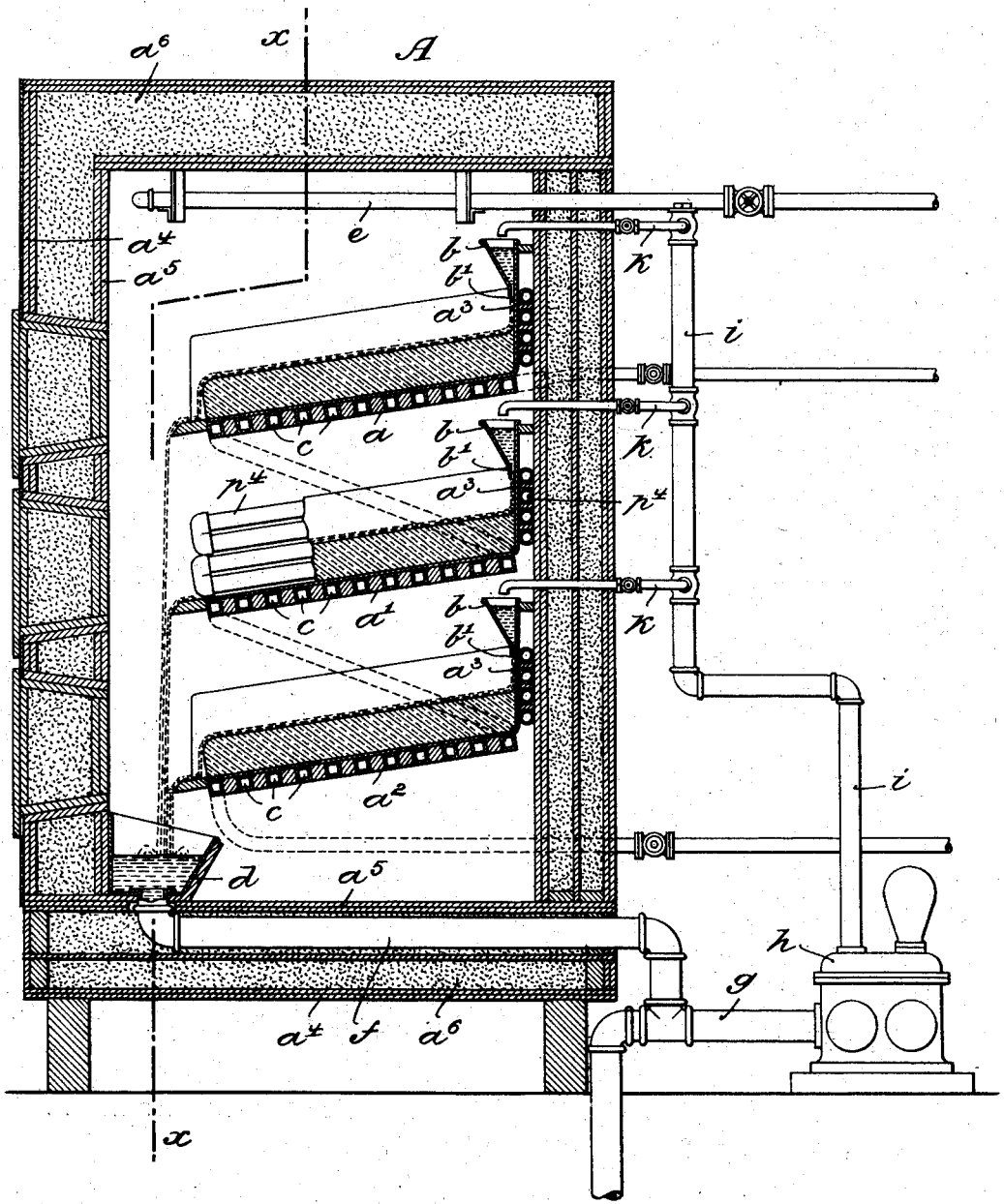

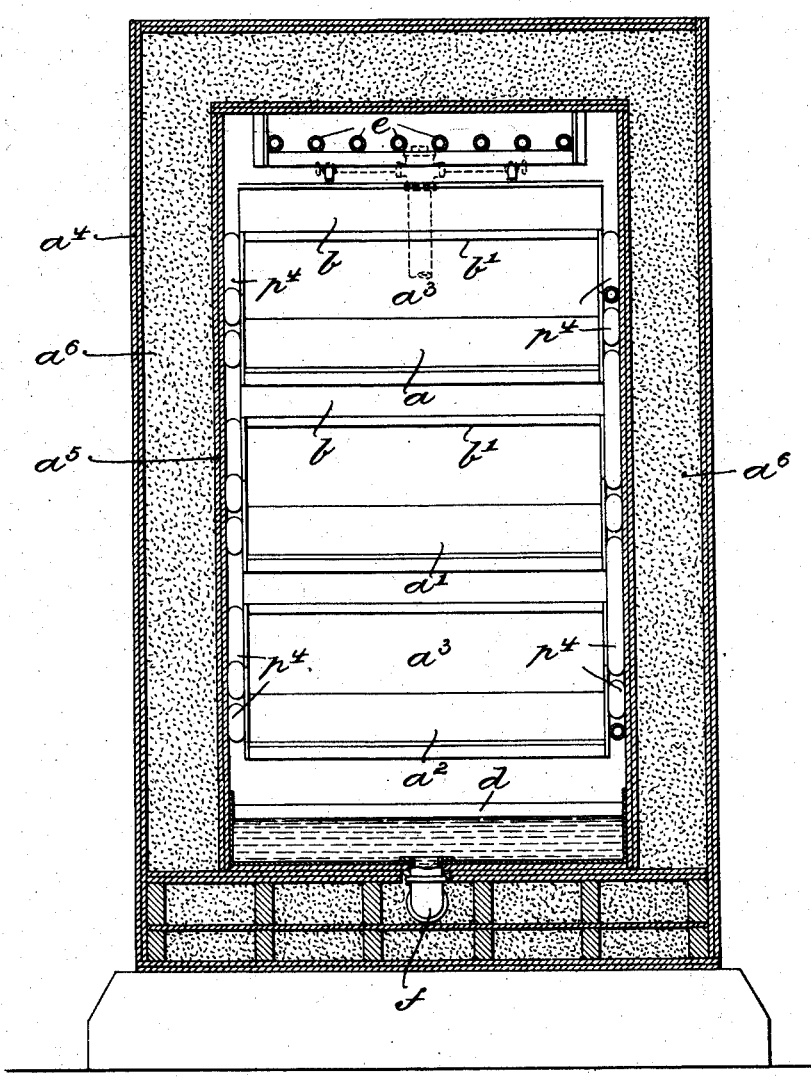

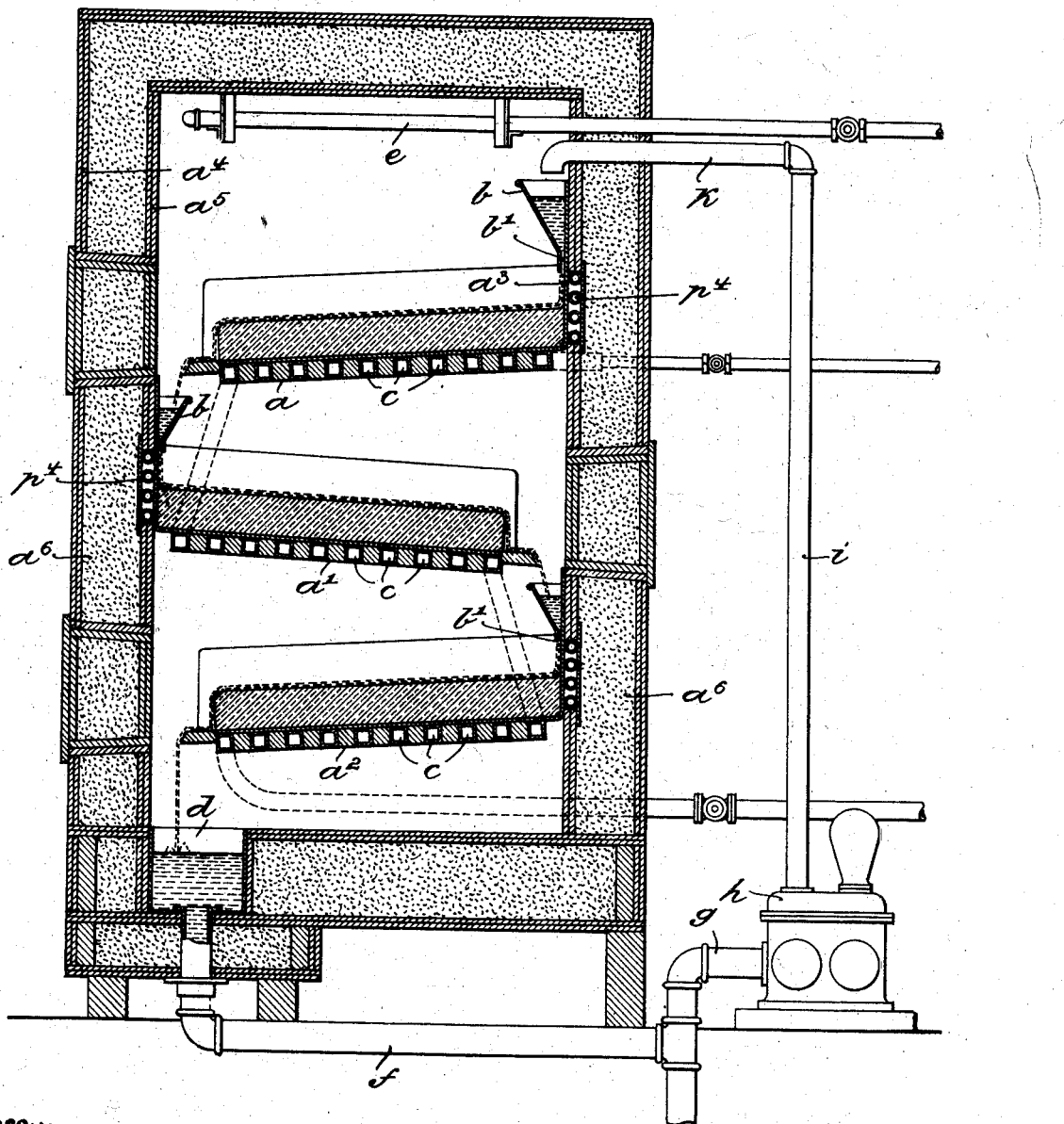

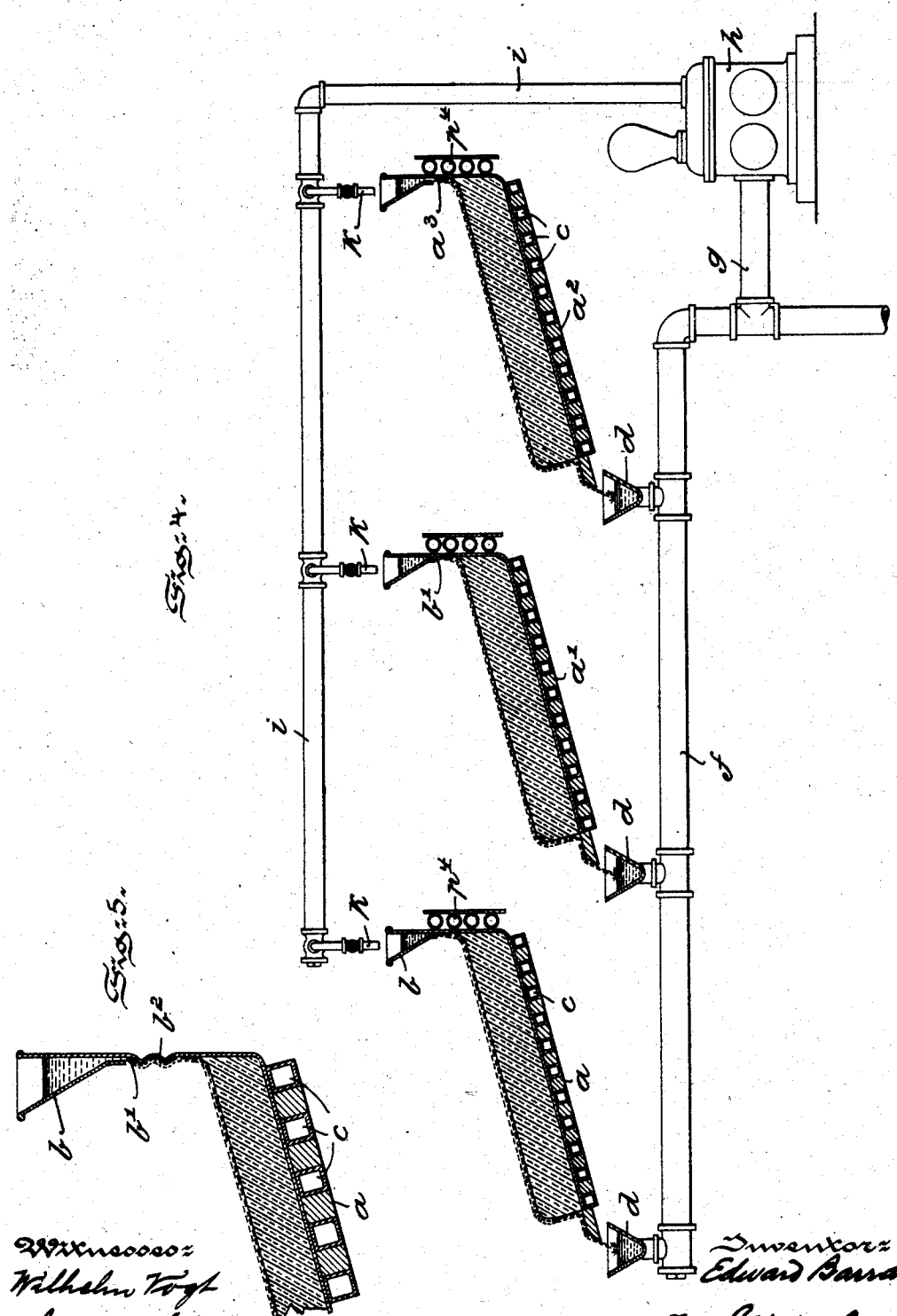

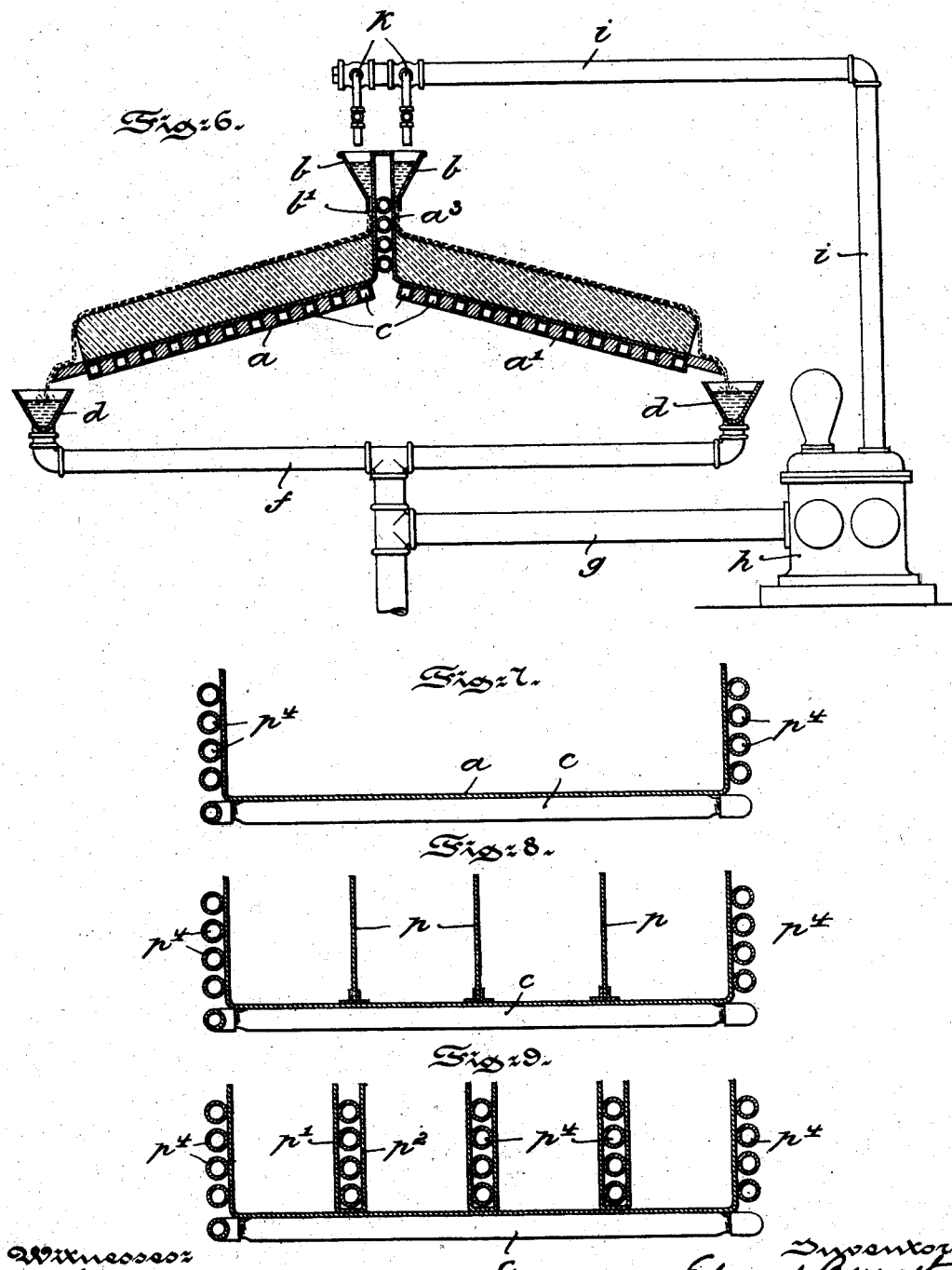

EDWARD BARRATH, OF PHILADELPHIA, PENNSYLVANIA, ASSIGNOR OF TWO-THIRDS TO AUGUSTUS BEITNEY AND JOHN J. KELLER, OF PHILADELPHIA, PENNSYLVANIA.

APPARATUS FOR MANUFACTURING PLATE-ICE.

SPECIFICATION forming part of Letters Patent No. 706,511, dated August 12, 1902.

Application filed November 29, 1901. Serial No. 84,008. (No model.)

*To all whom it may concern:*

Be it known that I, EDWARD BARRATH, a citizen of the United States, residing at the city of Philadelphia, in the county of Philadelphia and State of Pennsylvania, have invented certain new and useful Improvements in Apparatus for Manufacturing Plate-Ice, of which the following is a specification.

My invention has relation to an apparatus for manufacturing plate-ice in a pure crystal-like state or condition, free from air-bubbles and needles.

The principal objects of my invention are, first, to provide apparatus adapted to produce or manufacture plate-ice in a pure crystal-like state more expeditiously than hitherto and in which the cost of its production is lessened, as well as plant reduced for the manufacture of a given quantity of such ice; second, to provide an apparatus adapted to form water into a film or sheet and to present the film or sheet continuously to a freezing medium; third, to provide an apparatus adapted to form water into a film or sheet and to present said film or sheet continuously to a substantially flat freezing medium in the presence of adjacent substantially flat freezing media; fourth, to provide an apparatus adapted to first form water into a film or sheet and to then present continuously such film or sheet to a substantially flat freezing medium in the presence of air of low temperature to chill the water from both sides during the freezing; fifth, to provide an apparatus adapted to first form water into a film or sheet and to then present the film or sheet continuously to a substantially flat freezing medium and thereafter continuing the flow of the film or sheet of water over previously-frozen strata of ice formed on said medium; sixth, to provide an apparatus adapted to first form water into a film or sheet and to then present initially the same to a substantially flat freezing medium to cause the film or sheet to continuously flow over the previously-frozen strata of ice, whereby plate-ice is adapted to be built up by successive accretions or additions to the strata of ice; seventh, to provide an apparatus adapted to first form water into a film or sheet and to then present the film or sheet continuously to a substantially flat freezing medium to cause the water to rapidly freeze or congeal on the same and also to provide means for utilizing the escaping water not frozen for re-presentation in film or sheet form on the freezing medium over the previously-frozen strata of ice formed thereon; eighth, to provide an apparatus adapted to first form water into a film or sheet and to then present the film or sheet continuously to a substantially flat and inclined freezing medium; ninth, to provide an apparatus adapted to form water into a film or sheet and to then guide the film or sheet to a substantially flat and inclined freezing medium to cause the film or sheet by gravity to flow continuously over the freezing medium; tenth, to provide an apparatus adapted to first form water into a film or sheet and to guide the film or sheet to a substantially flat freezing medium to freeze or congeal on the same and utilizing the escaping water not frozen for re-presentation in film or sheet form to the freezing medium over the previously-frozen strata of ice and also providing means whereby the plate or block of ice formed can be readily released or removed from the freezing medium; eleventh, to provide an apparatus with a substantially flat freezing medium with means adapted to permit of the dividing of the formed blocks or plates of ice into sections by presenting in their formation the water in film or sheet form and also providing means for permitting of the release or removal of the plates or blocks of ice so formed from said medium, and, twelfth, to provide an apparatus for making plate or block ice, as described, in sectional form and providing the apparatus with means arranged so that the passage of a heating medium therethrough is allowed for permitting of the ready release or quick removal of the formed plates or blocks of ice in sections from the freezing media of the apparatus.

My invention, stated in general terms, consists of an apparatus for making plate-ice constructed and arranged in substantially the manner hereinafter described and claimed.

The nature and scope of my invention will be more fully understood from the following description, taken in connection with the accompanying drawings, forming part hereof, in which—

Figure 1 is a sectional view of an ice plant in one form embodying features of my invention. Fig. 2 is a sectional view on the line $xx$ of Fig. 1. Fig. 3 is a sectional view of another or modified form of such plant. Fig. 4 is a view, partly in section and partly in elevation, of a further modified form of apparatus for the making of plate or block ice of my invention, showing the manner of collecting the escaping water from the freezing media and discharging again into the receptacles or tanks, so as to be presented again in film or sheet form to the strata of ice formed by the freezing media. Fig. 5 is a similar view of another form of my invention, showing a slightly-modified arrangement in the means for presenting the water in film or sheet form to the freezing medium. Fig. 6 is a similar view, partly in section and partly in elevation, of a still further modified form as to the arrangement of the refrigerating media and of the means for supplying water to the elevated tanks for permitting of the discharge of the water therefrom in film or sheet form to said media and of the means for collecting the escaping water and conveying the same back again to the elevated tanks for use over again in film or sheet form. Figs. 7, 8, and 9 are views in section and in elevation of different forms of freezing plates or platforms divided off, as to Figs. 7 and 8, into partitions for permitting, by the coils located adjacent to the walls of said plates or platforms, of removal of the formed plate or block of ice therefrom by permitting of the passage of a heated medium, such as hot brine or other substance, through the coils of pipe for heating up the walls of said plates or platforms, and thereby loosening the ice therefrom and the said partitions, and also adapted to subdivide into sections the blocks or plates of ice to be formed on said plates or platforms.

Referring to the drawings, $a$, $a'$, and $a^2$ represent freezing plates or platforms of any suitable construction, but preferably arranged as hereinafter explained and illustrated. These freezing plates or platforms $a$, $a'$, and $a^2$ may be superposed and slightly inclined, as illustrated in Figs. 1 and 3. Each of such freezing plates or platforms is provided with a vertical projecting extension $a^3$, forming in the present instance a support and a portion of the water tank or receptacle $b$, arranged a certain distance above each of the plates or platforms $a$, $a'$, and $a^2$. The tanks or receptacles $b$ are made tapering or substantially wedge shape in cross-section and are provided at their lower ends with a narrow outlet $b'$ to allow the water in said tanks $b$ to flow from each of them in the form of a film or sheet. Such a film or sheet of water is conveyed in a downward direction by the vertical projecting extension $a^3$ of each of the plates or platforms $a$, $a'$, and $a^2$ onto the same, and over which it then passes by gravity, due to the inclined position of the plates. The speed of flow of the water over the freezing plates or platforms can be readily regulated by more or less inclining said plates or platforms. Through the pipes $c$ of the freezing plates or platforms is conducted any suitable freezing medium, such as brine or ammonia, and the water passing over the plates or platforms in the form of a film or sheet is rapidly frozen thereon by the action of the freezing medium. The surplus water not congealed or frozen on said plates or platforms $a$, $a'$, and $a^2$ in its travel over the same is either collected from each of the plates or platforms into a tank or receptacle $d$, as illustrated in Fig. 1, or is conducted from one plate or platform onto the next one below and from the last of said freezing plates or platforms into the collecting-tank $d$, as illustrated in Fig. 3. In the latter instance, however, the extensions $a^3$ of the freezing plates or platforms $a$, $a'$, and $a^2$ and the tanks $b$ are preferably arranged opposite each other, so that the surplus water, as shown, can be directly conducted into the tank $b$ of the second superposed plate or platform, and so on for the distribution or spreading of the same in film or sheet form over the freezing plates or platforms.

Above the uppermost freezing plate or platform $a$ is arranged an air-cooling coil $e$ to cool the air above said plate or platform. The air above and between the other plates or platforms $a'$ and $a^2$ is cooled by the free under side of the freezing-pipes $c$ and for this reason requires no special cooling-pipes. The air so cooled forms an additional freezing medium adjacent to said plates or platforms $a$, $a'$, and $a^2$, which assists in the chilling of the film or sheet of water passing over said plates or platforms. A film of water chilled from both sides will rapidly congeal or freeze to the plates or platforms $a$, $a'$, and $a^2$. A film of water by being continuously kept in motion over the previously-frozen strata will by successive accretions or additions to the same build up a plate or block of ice upon the freezing plate or platform of any thickness desired and in much less time than hitherto was required. A body of water of any size being presented to a freezing medium in the form of a film or sheet will therefore be rapidly congealed or frozen. By so rapidly forming ice less space for the production of a given quantity of ice is required, and hence the number of freezing plates or platforms is greatly lessened for the production of such plate or block ice. By this reduction of freezing plates or platforms and pipes it follows that also a smaller engine and compressor for a given quantity of ice will be required and the cost of production of plate or block ice will be reduced to a fraction as compared with the present cost of production of plate or block ice. The film or sheet of water being kept in motion on the freezing plates or platforms $a$, $a'$ and $a^2$ prevents internal air-bubbles in the formation of the ice, and thus plate or block ice in a pure or crystal-like state or condition is obtained. This feature of preventing air-bubbles from freezing either to the freezing-plates or to the previously-formed strata of ice by simply keeping the film of water in motion successively overcomes the necessity of artificial agitation of the water to be frozen, as in the ordinary processes employed. Furthermore, such agitation, for instance, by means of air injected into the water to be congealed causes the heating of the same by the air, which heating naturally retards the congealing or freezing of the water. The surplus water from the freezing plates or platforms $a$, $a'$, and $a^2$, which has a temperature at or near the freezing-point and which is collected in the tank or receptacle $d$, as hereinbefore described, is conducted back onto said plates or platforms and the previously-frozen strata from said plates or platforms by means of the pipes $f$ and $g$, the pump $h$, and supply-pipe $i$, and branch pipes $k$, leading from said supply-pipe $i$, to the distributing-tanks $b$, as illustrated. Owing to the low temperature of said surplus water, the same will be more rapidly congealed, and thus accelerate the freezing.

Instead of feeding the surplus water of each of the distributing-tanks $b$ simultaneously, as illustrated in Fig. 1, the surplus water can be fed by the supply-pipe $i$ to the uppermost distributing-tank $b$ only, from which the surplus water passes in film-like form, as hereinbefore described, from one freezing plate or platform to another successively, and finally, if not congealed or frozen to the previously-frozen ice on said plates or platforms, is returned to the collecting-tank $d$. The pipe $g$, into which the pipe $f$ from the collecting-tank $d$ extends, conducts and mixes the surplus water with the supply-water drawn by the pump $h$ from any suitable source and cools the same. However, this surplus water can be fed independently from the water-supply to the distributing-tanks $b$.

In Fig. 5 the wall below the tank $d$ may be corrugated, as at $b^2$, in order to insure a uniform distribution from the tank onto the freezing plate or platform in film or sheet like form, as the water will follow from the elevated tank $b$ the contour of the wall, and being of corrugated form it will retard the flow of water to the plate and will thus spread the issuing water into a thin film or sheet. The plates or platforms $a$, $a'$, and $a^2$ are provided with side walls, as clearly illustrated in Figs. 7 and 8, and with coils $p^4$, located adjacent thereto, to permit of the circulation of a heating medium for expediting removal of the plates or blocks of ice formed on the plates or platforms by the freezing media.

In Fig. 8 the plate or platform is provided with a series of inner projections $p$, which are heated up by radiation from the coils $c$ and $p^4$, located underneath and on the sides of the outer walls of the plates or platforms, while in Fig. 9 these internal partitions $p$ are formed with double walls $p'$ and $p^2$ and between which coils of pipe $p^4$ are mounted to hasten heating up of the walls, and thereby to expedite removal of the plates or blocks of ice. The plates or platforms $a$, $a'$, and $a^2$ may be inclosed within a housing A, having double walls $a^4$ and $a^5$, with a filling $a^6$ between the walls of any suitable material, as illustrated in Figs. 1, 2, and 3.

In Figs. 4, 5, and 6 the plates or platforms $a$, $a'$, and $a^2$ may be in an inclined position, as shown, and may be arranged within any suitable housing and, as so inclined, permit by gravity when the heating medium is brought to bear against the walls of the plates or platforms at periodic intervals to effect quickly and reliably the removal of the formed plates or blocks of ice.

I do not wish to be understood as limiting myself to the precise construction of the plates and other parts of the apparatus of my invention as illustrated nor as hereinbefore described, as my invention comprehends other modifications coming within the purview or spirit of the said invention and not to be limited by said illustrations of the same nor particularly as to the minor details thereof.

Having thus described the nature and objects of my invention, what I claim as new, and desire to secure by Letters Patent, is—

1. In an apparatus for making artificial plate-ice, an inclined freezing surface or plate, a source of flowing-water supply discharging above the uppermost portion of the freezing surface or plate, and stationary means interposed between the water-supply and the surface or plate and arranged to receive the water and to present the same in film or sheet form to the uppermost portion of the freezing surface or plate.

2. In an apparatus of the character described, a series of superposed inclined freezing plates or surfaces, a source of water-supply for said plates and discharging at the uppermost portion of each plate, and a stationary means interposed between the water-supply and each plate and arranged to receive the water and to present the same in film or sheet form to the uppermost portion of each plate in series.

3. In an apparatus of the character described, a series of superposed, inclined plates having both upper and lower freezing-surfaces, a source of water-supply for each plate and discharging at the uppermost portion thereof, and a stationary means interposed between the water-supply and each plate and arranged to receive the water and to present the same in film or sheet form to the upper surface of each plate in series.

4. In an apparatus of the character described, an inclined freezing-plate, an extension projecting vertically from the uppermost portion of said plate, a wedge-shaped tank having for its vertical wall the extension on the freezing-plate, a contracted outlet formed at the base of the tank above the freezing-plate, and a source of water-supply discharging into said tank.

5. In an apparatus of the character described, an inclined freezing-plate, an extension projecting vertically from the uppermost portion of said plate, a tank having a narrow outlet leading to one side of the extension and arranged above the plate, a source of water-supply leading to said tank, and a releasing-coil arranged adjacent to the other side of said extension.

6. In an apparatus of the character described, an inclined freezing-plate, a corrugated extension projecting vertically from the uppermost portion of said plate, a tank having a narrow outlet leading to the extension above its corrugations, and a source of water-supply leading to said tank.

In testimony whereof I have hereunto set my signature in the presence of two subscribing witnesses.

EDWARD BARRATH.

Witnesses:
J. WALTER DOUGLASS,
THOMAS M. SMITH.